United States Patent [19]

Tajima et al.

[11] 4,391,493
[45] Jul. 5, 1983

[54] METHOD TO INCREASE FOCAL DISTANCE AT TELEPHOTOGRAPHIC SIDE OF A ZOOM LENS SYSTEM

[75] Inventors: Akira Tajima, Kawasaki; Sadahiko Tsuji, Yokohama, both of Japan

[73] Assignee: Canon Kabushiki Kaisha, Japan

[21] Appl. No.: 741,789

[22] Filed: Nov. 15, 1976

[30] Foreign Application Priority Data

Nov. 18, 1975 [JP] Japan .................................. 50/138500

[51] Int. Cl.³ .................... G02B 15/02; G02B 15/16
[52] U.S. Cl. ..................................... 350/422; 350/427
[58] Field of Search ................................ 350/183, 184

[56] References Cited

U.S. PATENT DOCUMENTS 2,559,844  7/1951  Bennett .............................. 350/183
3,784,284  1/1974  Nakamura ........................... 350/214

Primary Examiner—John K. Corbin
Assistant Examiner—Paul M. Dzierzynski
Attorney, Agent, or Firm—Toren, McGeady and Stanger

[57] ABSTRACT

The focal length at the telephoto end of a zoom lens is increased by making the magnification of the system $\beta$ with auxiliary focusing means while the ordinary focusing means of the zoom lens system is focused on infinity. An attachment lens having a focal length fA is provided in front of the zoom lens system in such a manner that the composite lens system is focused on infinity. The product fA $\beta$ of the magnification $\beta$ and the focal length fA of the attachment lens is longer than the focal length of the zoom lens.

10 Claims, 12 Drawing Figures

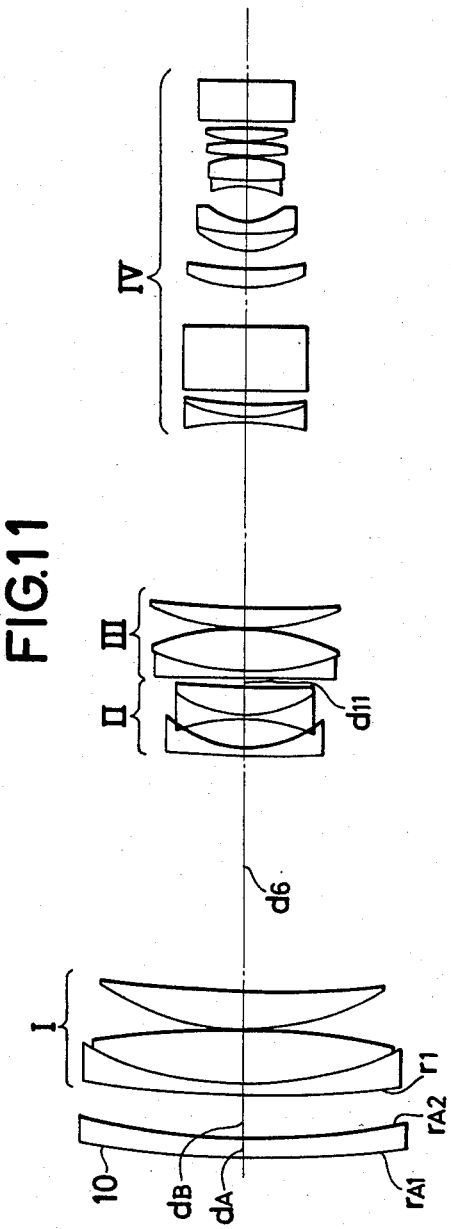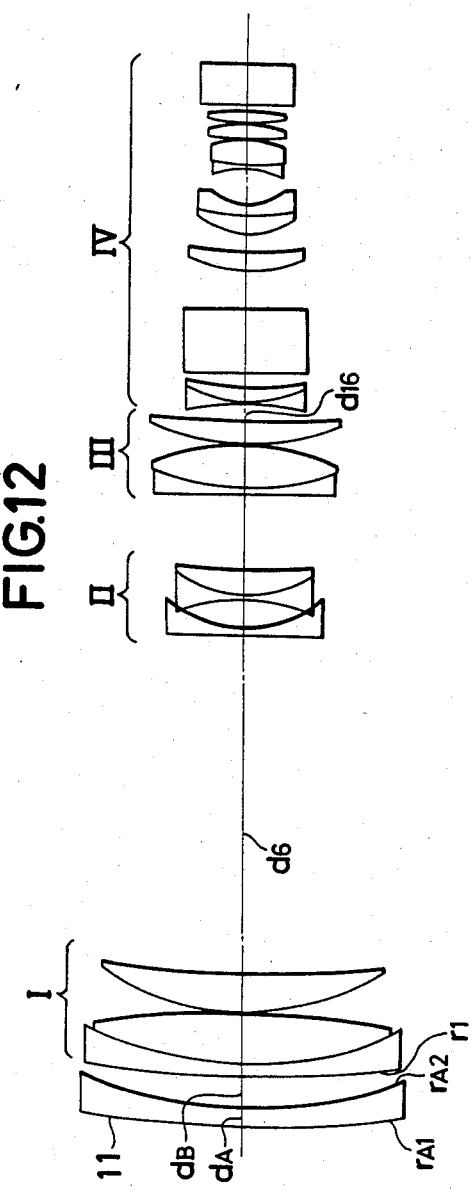

METHOD TO INCREASE FOCAL DISTANCE AT TELEPHOTOGRAPHIC SIDE OF A ZOOM LENS SYSTEM

BACKGROUND OF THE INVENTION

The present invention relates to methods and means for increasing the focal length of a zoom lens at its telephotographic side.

In the past, this has been done by providing an afocal attachment lens in front of the zoom lens system. FIG. 1 shows a means for providing telephotographic characteristics for a zoom lens system by said afocal attachment lens. Here the afocal attachment lens consists of a positive lens group 1 and a negative lens group 2. In FIG. 1 an object point at infinity is imaged on a film surface 4 by an attachment lens system (1, 2) and a zoom lens system 3. Since the attachment lens in this method is an afocal system, when the focal distance or length of the positive lens group 1 is expressed by $f_1$, the focal distance of the negative lens group 2 is represented by $f_2$, and the distance between the principal points of the positive lens group 1 and the negative lens group 2 is expressed by D, the result is expressed by:

$$f_1 = D + |f_2|$$

At this time, the focal distance $f_z$ of the zoom lens system 3 is expressed by:

$$f_z = \frac{f_1}{|f_2|} \times f_T$$

wherein the focal distance of the zoom lens at telephotographic end is expressed by $f_T$. Since the relationship between $f_1$ and $f_2$ is $f_1 > |f_2|$ because of the aforementioned afocal condition equation $f_1 = D + |f_2|$, $f_1/|f_2|$ can be expressed by the inequality $f_1/|f_2| > 1$, and thus telephotographic characteristics are provided. The degree of telephotographic characteristics provided will be greater as D becomes longer and $|f_2|$ shorter when $f_1$ is constant, or as $f_1$, $|f_2|$ are made shorter when D is constant. However, an attachment lens of this type become complicated because of the need to satisfactorily correct the chromatic, spherical and other aberrations of the total lens system. Also such lenses are undesirably large and heavy, not easily portable and have poor handling characteristics.

SUMMARY OF THE INVENTION

An object of the present invention is to avoid these disadvantages. Another object is to provide an attachment lens made of a small number of lenses, and to form a system which can provide telephotographic characteristics with easy portability and good handling characteristics at low cost.

According to a feature of the present invention a zoom lens focused at infinity has its lateral magnification made $\beta$ by auxiliary means different from that in an ordinary zoom lens. A positive or negative attachment lens is provided in front of a main zoom lens system in this state, for making the position of the focus of said main zoom lens system infinite. When the focal distance of the attachment lens at this time is expressed by fA, the focal length of the overall zoom lens is $fA \times \beta$. Therefore, when the value of $fA \times \beta$ becomes longer than the focal distance $f_T$ at telephotographic end of a zoom lens, the telephotographic characteristics of the zoom lens can be provided. The value of the focal distance fA of the attachment lens that the value of lateral magnification $\beta$ which is a limited value of said main zoom lens system is made zero and the main zoom lens system is focused at infinite, will be indicated by $fA = S_1 + D$. Here, $S_1$ is a distance from the front principal point of a main lens system to an imaging plane, and D is a distance between principal points of the main zoom lens system and the attachment lens.

The auxiliary means involve a different type of handling from the handling in an ordinary zoom lens and for example require shifting a portion of lenses within the zoom lens system by such means as a macro-handling mechanism, or withdrawing a portion of lenses constituting a zoom lens system, or inserting a new lens at a part of a zoom lens. As is apparent from the above, ordinary handling of a zoom lens as referred to in this specification does not include handling such as in a macro-mechanism.

As used herein the term lateral magnification is sometimes referred to as "imaging" magnification. However the term imaging magnification should be understood to mean lateral magnification.

BRIEF DESCRIPTION OF THE DRAWINGS

FIG. 7, FIG. 8 and FIG. 9 are drawings to show an example of a main zoom lens system to which the present invention is applied, wherein FIG. 7 shows a cross-section of a lens system at a wide angle end, FIG. 8 shows the same at an intermediate state while FIG. 9 shows the same at a telephotographic end.

FIG. 11 is a cross-sectional view of a lens to show a second example employing a method of providing telephotographic characteristics of the present invention.

FIG. 12 is a cross-sectional view of a lens to show a third example employing a method of providing telephotographic characteristics of the present invention.

DETAILED DESCRIPTION OF THE PREFERRED EMBODIMENT

Figure 1:
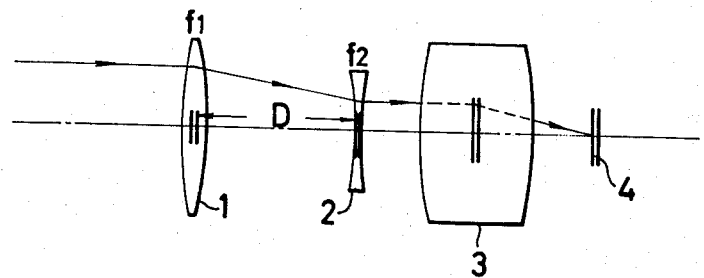
FIG. 1 is a drawing to show a conventional method of providing telephotographic characteristics.
Figure 2:
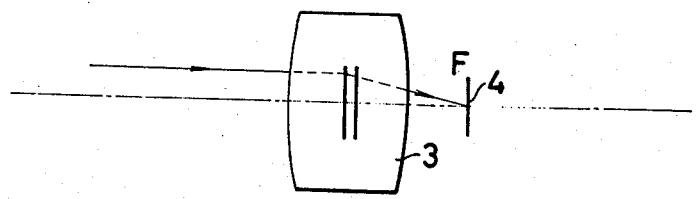
FIG. 2, FIG. 3, FIG. 4, FIG. 5 and FIG. 6 are drawings to explain a system for providing telephotographic characteristics for a zoom lens according to the present invention.
Figure 3:
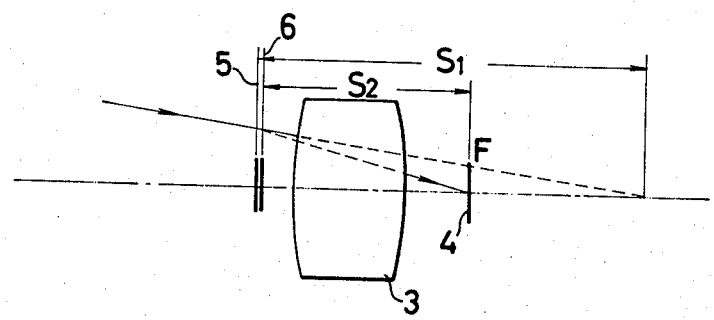
Figure 4:
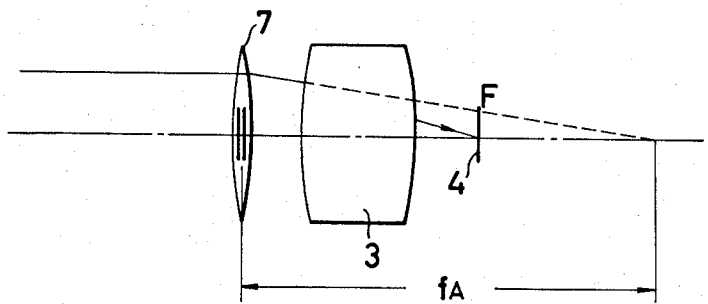
Figure 5:
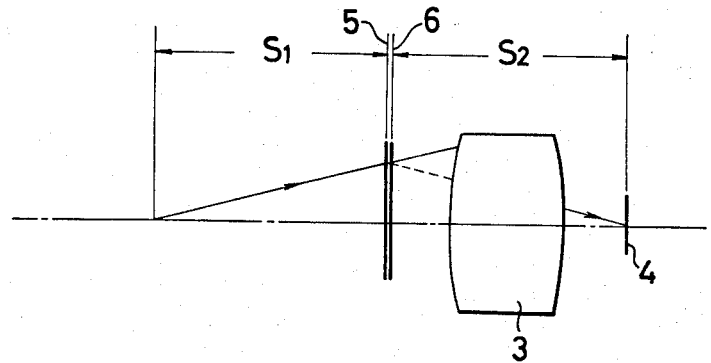

FIG. 2 to FIG. 6 show a principle of a system of providing the telephotographic characteristics of the present invention. In FIG. 2 a main zoom lens system 3 is focused on infinity by an ordinary focusing lens. The luminous flux is imaged on a fixed film surface 4. The imaging magnification at this time will be $\beta = 0$. As shown in FIG. 2, the focus of the main zoom lens system is fixed. Auxiliary handling means of a main zoom lens system, for example a portion of the lenses constituting the main zoom lens system 3 is shifted in a manner different from an ordinary zoom lens, or a portion of lenses of the main zoom lens system is withdrawn, or a lens or lenses are added from outside to the main zoom lens system, so that an object point at a position spaced a distance $S_1$ from the front main plane 5 of the main zoom lens system will be imaged on the above mentioned film surface 4 as shown in FIG. 3 and FIG. 5. When the distance from the rear main plane 6 of the main zoom lens system at this time to an imaging plane (film surface) 4 is expressed by $S_2$, the imaging magnification $\beta = S_2/S_1$.

FIG. 3 shows how an object point at infinity is shifted from the front main plane 5 of the main lens to an imaging plane when the luminous flux impinging in the main zoom lens system converges. Generally speaking it is impossible to image such converging luminous flux on the film surface 4 with the ordinary focusing means of a main zoom lens system. FIG. 5 shows an object point on the side of the front main plane 6 of the main zoom lens system opposite the imaging plane. In this case the object point is adjacent the main zoom lens system. In FIG. 5 it is possible to focus on a close object with an ordinary zoom lens having short distance focusing capability even if the aforementioned auxiliary means is not used. But in such case, when photographic characteristics are provided by providing such attachment lens as will be mentioned below for securing such state as shown in FIG. 5 using a focusing lens, focusing can not be done in a state telephotographic characteristics are provided. Thus the scope wherein focusing can be made will be only within a depth of field of focus of a main zoom lens system including an attachment lens system, thus it is not advantageous. Also in such case satisfactory telephotographic characteristics can not be provided. Therefore, in view of the above, it is desirable to use the above mentioned auxiliary handling means which are different from the ordinary handling means of a zoom lens, when a state shown in FIG. 5 is obtained. The front principal point and the rear principal point in each lens in the drawings are shown close to each other merely for convenience and the positional relationship does not affect the principle of the present invention.

Since the distances $S_1$ and $S_2$ are negative when they are measured toward the object side from the principal point and positive when they are measured toward the imaging plane side from the principal point, the imaging magnification $\beta$ shown in FIG. 3 will be positive and the $\beta$ shown in FIG. 5 will be negative.

Figure 6:
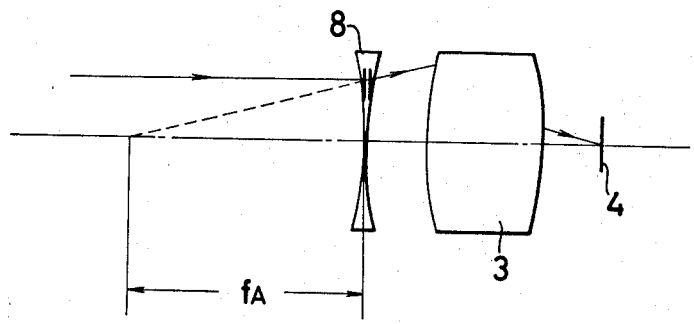

FIG. 4 illustrates a variation of the focusing shown in FIG. 3 wherein an attachment lens 7 having a focal distance $fA = S_1 + D$ is provided so that the luminous flux from infinity is imaged on the film plane 4. Also FIG. 6 illustrates a variation of the focusing shown in FIG. 5 wherein an attachment lens 8 with a focal distance $fA = S_1 + D$ is provided as mentioned above so that the luminous flux from infinite is imaged on the film surface 4. In the above, D is a distance between principal points of the main zoom lens system and the attachment lens.

As is apparent from FIG. 4 and FIG. 6, telephoto characteristics are provided by using a lens having positive refractive power when object point is at imaging plane (film surface) side of the front principal point 5 of the main zoom lens 3, and by using a lens having negative refractive power when the same is at opposite side.

The focal distance fH of a total system in which the focal distances of the attachment lens and of the main zoom lens in this case are synthesized will be:

$$fH = fA \times \beta$$

In order to provide telephotographic characteristics, since it be required that said fH is longer than the telephotographic end fT of the main zoom lens, the imaging magnification $\beta$ of the main zoom lens and the focal distance fA of the attachment lens (7, 8) are made so as satisfy the condition:

$$fT < fH = fA \times \beta$$

Therefore, in the method of providing telephotographic characteristics in the present invention, since the attachment lens provided in front of the main lens can be a positive lens or negative lens consisting of at least one lens member, the attachment lens can be made small and simplified with good portability and handling characteristics.

A main zoom lens to which the method of providing telephotographic characteristics in the present invention is applied contains a focusing lens having positive refractive power, a variator lens having negative refractive power, a compensator lens having positive refractive power, and a relay lens having positive refractive power positioned in that order from the object end. Variation in magnification are made by moving both the variator lens and the compensator lens linearly. When the distance between the variator lens and the compensator lens is shortest the main zoom lens performs its telephoto function. It performs a wide angle end as said distance is longest. As a first method to provide telephotographic characteristics by the above means in this type of zoom lens, a compensator lens in a state in which focusing is set at infinite at telephotographic end of a main zoom lens is shifted to an object side and an attachment lens having positive refractive power is provided in front of a main zoom lens. As a second method a variator lens similarly in a state wherein a main zoom lens system focused on infinity at telephotographic end is shifted toward an imaging plane and an attachment lens having negative refractive power is provided in front of a main zoom lens system. As a third method, a variator lens and a compensator lens in a main zoom lens system focused on infinity at telephotographic end are both shifted to an imaging plane and an attachment lens having negative refractive power is provided in front of the main zoom lens system.

Figure 7:
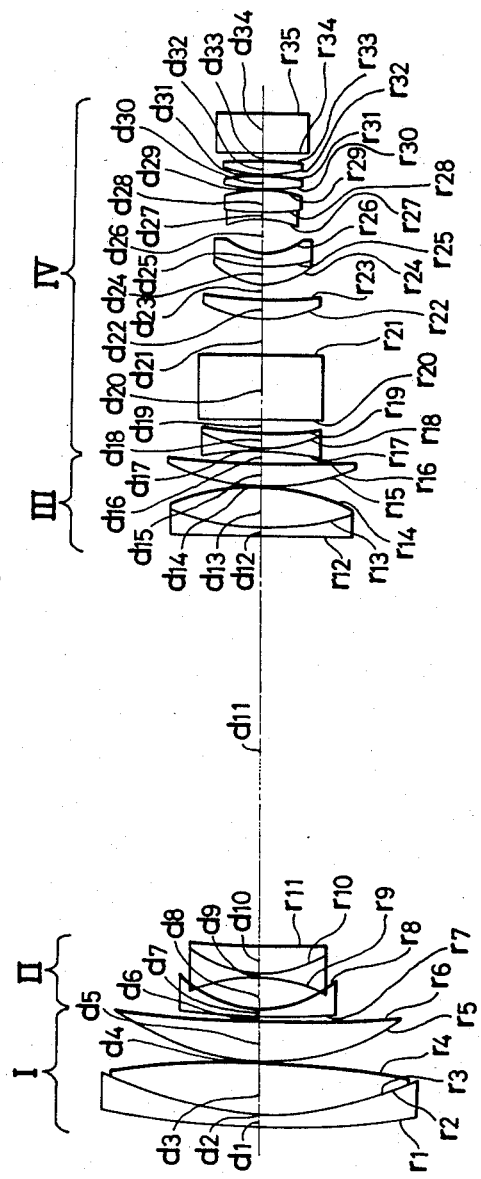
Figure 8:
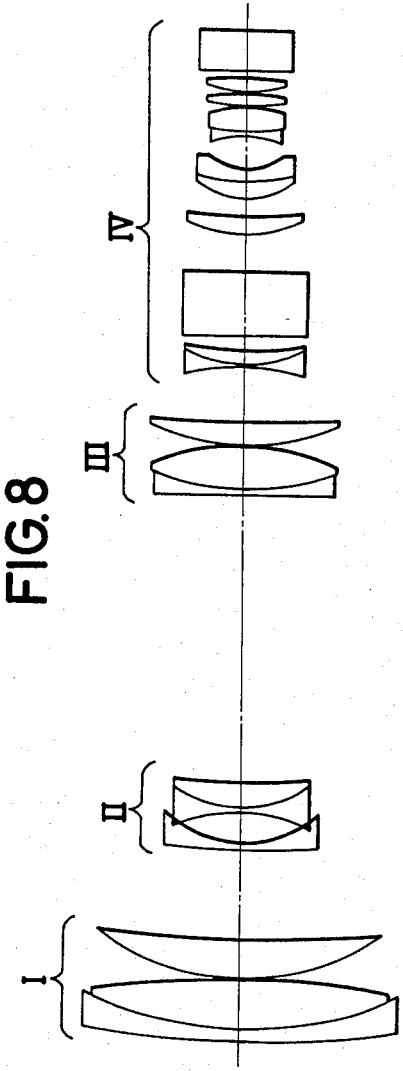
Figure 9:
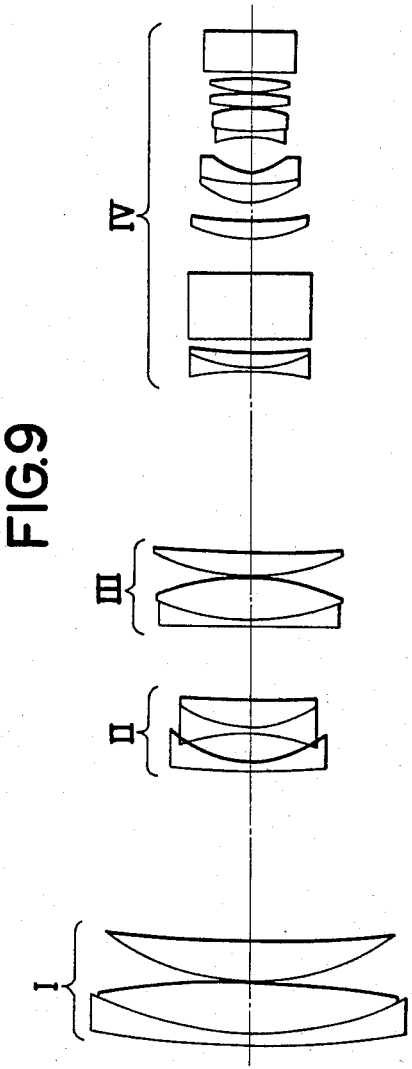

An example of said zoom lens is shown from FIG. 7 to FIG. 9, wherein FIG. 7 shows a lens system in the wide angle position, FIG. 8 shows the same in an intermediate mode, and FIG. 9 shows the same at position. Group I is a positive lens group for focusing, and group II is a negative variator lens group, while group III is a positive compensator lens group, and group IV is a positive relay lens group, wherein the group II and group III constitute the zooming portion. Various data values of said main zoom lens system will be shown below:

Data for the main zoom lens system:
f (focal distance) = 7.24 to 68.8; F 1:1.14;
Angle of field: 54.2° to 5.8°;
ri: curvature radius of the i-th plane
di: plane distance between the i-th plane and the (i+1)th plane
ni: refractive index of the i-th lens
vi: dispersion of the i-th lens

| Plane No. | ri | di | ni | vi |
|---|---|---|---|---|
| 1 | 191.7 | 1.7 | $n_1 = 1.80518$ | $v_1 = 25.4$ |
| 2 | 58.385 | 0.366 | | |
| 3 | 62.232 | 8.5 | $n_2 = 1.64000$ | $v_2 = 60.2$ |
| 4 | −168.79 | 0.2 | | |
| 5 | 43.4021 | 6.5 | $n_3 = 1.64000$ | $v_3 = 60.2$ |

-continued

| | | | | |
|---|---|---|---|---|
| 6 | 207.42 | (d$_6$) | | |
| 7 | 267.23 | 1.0 | n$_4$ = 1.71300 | v$_4$ = 54.0 |
| 8 | 18.235 | 5.3 | | |
| 9 | −29.654 | 0.7 | n$_5$ = 1.69680 | v$_5$ = 55.7 |
| 10 | 18.9525 | 4.5 | n$_6$ = 1.80518 | v$_6$ = 25.4 |
| 11 | 125.36 | (d$_{11}$) | | |
| 12 | 5852.3 | 1.19 | n$_7$ = 1.80518 | v$_7$ = 25.4 |
| 13 | 43.22 | 6.98 | n$_8$ = 1.64000 | v$_8$ = 60.2 |
| 14 | −37.9 | 0.2 | | |
| 15 | 38.2234 | 3.71 | n$_9$ = 1.65160 | v$_9$ = 58.6 |
| 16 | 224.952 | (d$_{16}$) | | |
| 17 | −60.061 | 0.7 | n$_{10}$ = 1.65160 | v$_{10}$ = 58.6 |
| 18 | 21.63 | 2.3 | n$_{11}$ = 1.80518 | v$_{11}$ = 25.4 |
| 19 | 50.002 | 2.35 | | |
| 20 | ∞ | 11.0 | n$_{12}$ = 1.63854 | v$_{12}$ = 55.4 |
| 21 | ∞ | 6.06 | | |
| 22 | 21.63 | 3.37 | n$_{13}$ = 1.76200 | v$_{13}$ = 40.2 |
| 23 | 63.98 | 2.62 | | |
| 24 | 12.0776 | 3.07 | n$_{14}$ = 1.71300 | v$_{14}$ = 54.0 |
| 25 | 29.918 | 1.83 | n$_{15}$ = 1.80518 | v$_{15}$ = 25.4 |
| 26 | 8.5258 | 6.07 | | |
| 27 | −13.987 | 1.0 | n$_{16}$ = 1.80518 | v$_{16}$ = 25.4 |
| 28 | 57.565 | 3.96 | n$_{17}$ = 1.67790 | v$_{17}$ = 55.3 |
| 29 | −19.74 | 0.41 | | |
| 30 | 117.089 | 2.03 | n$_{18}$ = 1.66446 | v$_{18}$ = 35.8 |
| 31 | −32.11 | 0.1 | | |
| 32 | 21.7328 | 2.13 | n$_{19}$ = 1.58144 | v$_{19}$ = 40.7 |
| 33 | −132.36 | 1.2 | | |
| 34 | ∞ | 6.8 | n$_{20}$ = 1.63854 | v$_{20}$ = 55.4 |
| 35 | ∞ | | | |

| | f = 7.238 | f = 15.72 | f = 68.79 |
|---|---|---|---|
| d$_6$ | 1.000 | 14.826 | 28.652 |
| d$_{11}$ | 68.654 | 47.639 | 12.561 |
| d$_{16}$ | 2.006 | 9.195 | 30.446 |

In the Examples 1 to 3 shown below, the distance from the front principal point in group I to an object point is measured and is represented by $\overline{S_1}$, in place of the front principal point of main zoom lens system for convenience, and the distance between principal points of an attachment single lens and a first lens group of a main zoom lens system is expressed by $\overline{D}$. The value of $\overline{D}$ is selected so that the attachment lens and the first lens group of the main zoom lens system will not come in contact with each other.

Example 1

Figure 10:
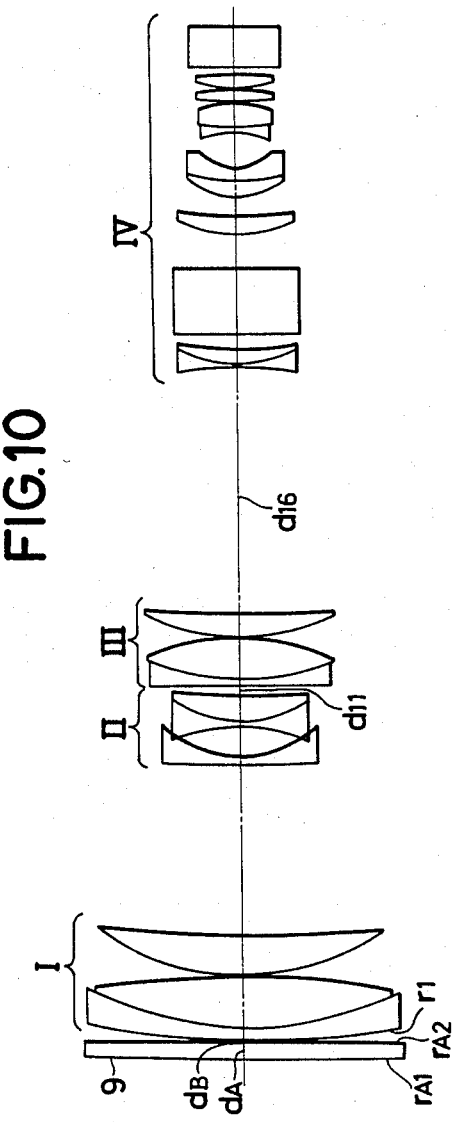
FIG. 10 is a cross-sectional view of a lens to show a first example employing a method of providing telephotographic characteristics of the present invention.

FIG. 10 illustrates the lens group III only, set for telephoto operation of the main zoom lens system shown in FIG. 9, and shifted by 11.0 toward the object. A convex lens 9 is provided in front of the main zoom lens system in this condition and the followings are satisfied:

$$\begin{bmatrix} \beta = 0.05512 \\ \overline{S_1} = 1862.0, \quad \overline{D} = 8.0 \quad fA = 1870 \end{bmatrix}$$

At this time an object point at infinite forms an image on a film surface, and the focal distance fH of a total system is:

$$fH = fA \times \beta = 103.1$$

which is longer than the telephoto focal distance fT=68.79 of the main zoom lens system. Also the data of the attachment lens 9 is:

rA$_1$ = 1000.0    rA$_2$ = −2798.8    dA = 3.0
NA = 1.51633    VA = 64.1

And the plane distance dB between the attachment lens 9 and r$_1$ plane of the main zoom lens is:

dB=0.44 and the d$_{11}$ and d$_{16}$ of the main zoom lens system is:

d$_{11}$ = 1.561    d$_{16}$ = 41.446

Example 2

FIG. 11 shows a state wherein the lens group II in the main zoom lens shown in FIG. 9 is set for telephoto operation and shifted by 11.0 to an image side. A concave lens 10 is provided in front of the main zoom lens system in that state so that the parallel luminous flux from an object at infinity is imaged on the film surface. The followings are now satisfied:

$$\begin{bmatrix} \beta = -0.21429 \\ \overline{S_1} = -530.3 \quad \overline{D} = 10.3 \quad fA = -520.0 \end{bmatrix}$$

Therefore, the focal distance fH of the total system at this time is:

$$fH = fA \times \beta = 111.4 > fT = 68.79$$

Thus telephotographic characteristics are provided. And the data of the attachment lens 10 is:

rA$_1$ = 200.0    rA$_2$ = 114.034    dA = 3.0
NA = 1.51633    VA = 64.1

The plane distance dB between the attachment lens 10 and the r$_1$ plane of the main zoom lens is:

dB=7.289

Also d$_6$ and d$_{11}$ of the main zoom lens system are:

d$_6$ = 39.652    d$_{11}$ = 1.561

Example 3

FIG. 11 is to show a state wherein the lens group II, the lens group III in a state of telephotographic end of the main zoom lens system shown in FIG. 9 are shifted integrally toward the image by 28.0, and a concave lens 11 is provided in front of the main zoom lens system in that state, so that the parallel luminous flux from an object at infinite is imaged on a film surface. Now the following are satisfied:

$$\begin{bmatrix} \beta = -0.4346 \\ \overline{S_1} = -229.8 \quad \overline{D} = 9.8 \quad fA = -220.0 \end{bmatrix}$$

Therefore, the focal distance fH of the total system at this time is:

$$fH = fA \times \beta = 95.6 > fT = 68.79$$

Thus telephotographic characteristics can be provided. And the data of the attachment lens is:

$rA_1 = 200.0 \quad rA_2 = 72.076 \quad dA = 3.0$
$NA = 1.51633 \quad VA = 64.1$ Also the plane distance dB between the attachment lens 11 and the $r_1$ plane of the main zoom lens is:

$$dB = 5.321$$

And the $d_6$ and $d_{16}$ of the main zoom lens system are:

$$d_6 = 56.652 \quad d_{16} = 2.446$$

What is claimed is:

1. A method of increasing the focal length at the telephotographic end of a zoom lens sytem, having first focusing means and second focusing means, and comprising the following steps:
   (a) the step of making the lateral magnification of a zoom lens system zero with said first focusing means;
   (b) the second step of bringing the lateral magnification of the zoom lens from zero to a definite value $\beta$ by activating the second focusing means while maintaining the first focusing means at a standstill; and
   (c) the third step of providing an attachment lens having length fA in front of said zoom lens system having a lateral magnification $\beta$, and making the lateral magnification of the composite lens system of said attachment lens and the zoom lens zero without moving a lens group in the zoom lens system,
whereby the product $fA \times \beta$ of said lateral magnification $\beta$ and the focal length fA of the attachment lens is longer than the focal length at the telephotographic end of the zoom lens system.

2. A method according to claim 1, in which said imaging magnification $\beta$ is positive and the refractive power of the attachment lens is positive.

3. A method according to claim 2, in which the second focusing means is such that part of the lenses outside the first focusing means move along the zoom axis.

4. A method according to claim 2, in which activating said second focusing means involves withdrawing a portion of the lenses constituting the zoom lens system.

5. A method according to claim 2, in which activating said second focusing means involves inserting other lens or lenses in inside of the zoom lens system.

6. A method according to claim 1, in which said imaging magnification $\beta$ is negative and the refractive power of the attachment lens is negative.

7. A method according to claim 6, in which the second focusing means is such that part of the lenses other than the first focusing means moves along the optical axis of the zoom lens.

8. A method according to claim 6, in which activating said second focusing means involves withdrawing a portion of the lenses constituting the zoom lens system.

9. A method according to claim 6, in which activating said second focusing means involves inserting other lens or lenses in inside of the zoom lens system.

10. A zoom lens having an expanded focal length on its telescopic end, comprising zooming means for changing the focal length, first focusing means to be used for ordinary focusing, second focusing means which operates independently of the first focusing means and in such a way that it brings the lateral magnification of the zoom lens system from zero to a definite value $\beta$ while the zooming means is at the telescopic end, and an attachment lens having a focal length fA which is attached on the object side in front of the zoom lens, while each lens group constituting the zoom lens system is fixed, and changing the lateral magnification of the zoom lens system from the value $\beta$ to zero when attached, the product of the lateral magnification $\beta$ and the focal length fA of the attachment lens being longer than the focal length of the telescopic end of the lens.

* * * * *